(12) United States Patent
Lin

(10) Patent No.: US 8,584,320 B2
(45) Date of Patent: Nov. 19, 2013

(54) HINGE MECHANISM AND CLAMSHELL DEVICE THEREOF

(71) Applicant: Wistron Corporation, New Taipei (TW)

(72) Inventor: Yu-Wei Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/665,096

(22) Filed: Oct. 31, 2012

(65) Prior Publication Data

US 2013/0175264 A1    Jul. 11, 2013

(30) Foreign Application Priority Data

Jan. 6, 2012   (TW) ............................. 101100666 A

(51) Int. Cl.
*E05D 11/10*   (2006.01)
*E05D 11/00*   (2006.01)

(52) U.S. Cl.
USPC .............. 16/320; 16/330; 16/303; 455/575.3; 248/292.12

(58) Field of Classification Search
USPC .................. 16/320, 334, 330, 303, 337, 340; 455/575.3; 248/274.1, 288.11, 292.12, 248/297.31; 361/679.27; 379/433.11, 379/433.13
See application file for complete search history.

(56) References Cited

U.S. PATENT DOCUMENTS

| | | | | |
|---|---|---|---|---|
| 2,622,831 A * | 12/1952 | Fullwood | ................. | 248/292.12 |
| 3,092,362 A * | 6/1963 | Walsh | ..................... | 248/292.12 |
| 3,508,181 A * | 4/1970 | Melone | ........................ | 335/212 |
| 4,547,092 A * | 10/1985 | Vetter et al. | ...................... | 403/59 |
| 4,858,868 A * | 8/1989 | Hoffelner | ................. | 248/292.12 |
| 5,108,213 A * | 4/1992 | Shields | ........................... | 403/18 |
| 5,125,131 A * | 6/1992 | Leblanc | .......................... | 16/330 |
| 5,299,773 A * | 4/1994 | Bertrand | ....................... | 248/514 |
| 5,346,272 A * | 9/1994 | Priest et al. | .............. | 296/146.11 |
| 5,538,215 A * | 7/1996 | Hosey | ......................... | 248/286.1 |
| 6,082,691 A * | 7/2000 | Moriyasu | ................... | 248/274.1 |
| 6,106,181 A * | 8/2000 | Neuhof | ........................... | 403/84 |
| 6,409,411 B1 * | 6/2002 | Crorey | ........................... | 403/97 |
| 7,171,247 B2 * | 1/2007 | Han | .......................... | 455/575.3 |
| 7,217,912 B2 * | 5/2007 | Hwang | ....................... | 250/208.1 |

(Continued)

FOREIGN PATENT DOCUMENTS

| | | | |
|---|---|---|---|
| CN | 102536011 A | * | 7/2012 |
| JP | 2005147323 A | * | 6/2005 |
| KR | 2012130659 A | * | 12/2012 |

*Primary Examiner* — Victor Batson
*Assistant Examiner* — Jason W San
(74) *Attorney, Agent, or Firm* — Muncy, Geissler, Olds & Lowe, PLLC

(57) ABSTRACT

A hinge mechanism and a clamshell device thereof are disclosed. The hinge mechanism includes a base, an axial portion, and a magnetic ring. The base is a metal material and has a pivot portion. The axial portion is pivoted to the pivot portion and can rotate with respect to the base, wherein the axial portion has at least one guiding groove. The magnetic ring is connected to the axial portion and adjacent to the base. The magnetic ring has at least one guiding portion used for sliding along the least one guiding groove. When the axial portion is rotating with respect to the base, the magnetic ring separates from the base and moving along the least one guiding groove by the at least one guiding portion. When the axial portion stops rotating, the magnetic ring attracts to connect to the base by a magnetic force.

20 Claims, 5 Drawing Sheets

(56) References Cited

U.S. PATENT DOCUMENTS

| | | | |
|---|---|---|---|
| 7,493,675 B2* | 2/2009 | Lin et al. | 16/330 |
| 7,532,459 B2* | 5/2009 | Son et al. | 361/679.56 |
| 7,971,318 B2* | 7/2011 | Kim et al. | 16/330 |
| 7,974,666 B2* | 7/2011 | Kosugi et al. | 455/575.3 |
| 8,015,666 B2* | 9/2011 | Wang | 16/320 |
| 8,018,714 B2* | 9/2011 | Luke et al. | 361/679.01 |
| 8,370,994 B2* | 2/2013 | Duan et al. | 16/330 |
| 2003/0208881 A1* | 11/2003 | Li | 16/330 |
| 2005/0276412 A1* | 12/2005 | Kfoury | 379/433.13 |
| 2006/0117527 A1* | 6/2006 | Tu et al. | 16/303 |
| 2006/0123596 A1* | 6/2006 | Chen et al. | 16/337 |
| 2007/0077971 A1* | 4/2007 | Tu et al. | 455/575.3 |
| 2007/0157432 A1* | 7/2007 | Weinstein | 16/320 |
| 2009/0144936 A1* | 6/2009 | Chern | 16/337 |
| 2009/0255090 A1* | 10/2009 | Kim et al. | 16/297 |
| 2010/0071159 A1* | 3/2010 | Myung | 16/303 |
| 2011/0289728 A1* | 12/2011 | Wang et al. | 16/337 |
| 2012/0023704 A1* | 2/2012 | Case | 16/321 |
| 2012/0037777 A1* | 2/2012 | Nagao | 248/292.12 |
| 2013/0175264 A1* | 7/2013 | Lin | 220/4.22 |

* cited by examiner

HINGE MECHANISM AND CLAMSHELL DEVICE THEREOF

FIELD OF INVENTION

The invention is related to a hinge mechanism and a clamshell device with the hinge mechanism, and more particularly related to a hinge mechanism and a clamshell device with the hinge mechanism for producing torque with magnetic force.

BACKGROUND

In today mechanical devices, clamshell devices are frequently used in daily life. A first cover and a second cover of a clamshell device are connected to each other with a hinge mechanism so that the first cover is capable of being rotated with respect to the second cover. For a hinge mechanism of a clamshell device to produce torque, it is usually achieved by using a gasket structure or a double wrapping structure.

In the prior art, no matter the gasket structure or the double wrapping structure is used, torque is usually produced from a friction among components. However, the friction among components also causes deterioration and heat. Therefore, in the prior art, lubrication liquid is often necessary to be applied among components for increasing lifetime and decreasing deterioration. With such way, however, maintenance cost may increase and oil leakage may occur when too much lubrication liquid is applied.

Thus, there is a need for inventing a hinge mechanism and a clamshell device with a hinge mechanism that decrease deterioration and solve the problems of conventional art.

SUMMARY OF INVENTION

A major objective of the present invention includes providing a hinge mechanism that produces torque effect with magnetic force.

Another major objective of the present invention includes providing a clamshell device with such hinge mechanism.

To achieve the aforementioned objectives, a hinge mechanism of the present invention includes a base, an axial portion, and a magnetic ring. The base is of metal material and has a pivot portion.

The axial portion is pivoted to the pivot portion of the base and rotates with respect to the base. The axial portion has at least one guiding groove. The magnetic ring is connected to the axial portion and adjacent to the base. The magnetic ring has at least a guiding portion. The at least one guiding portion of the magnetic ring slides along the guiding groove of the axial portion. When the axial portion rotates with respect to the base, the magnetic ring is separated from the base so as to move along the at least one guiding groove of the axial portion with the at least one guiding portion. When the axial portion stops rotation with respect to the base, the magnetic ring is attracted to connect to the base by magnetic force.

A clamshell device of the present invention includes a first cover, a second cover, and a hinge mechanism. The hinge mechanism is connected to the first cover and the second cover so that the first cover and the second cover are capable of rotating with respect to each other. The hinge mechanism includes a base and an axial portion. The base is of metal material and connected to the first cover, wherein the base has a pivot portion. The axial portion is pivoted to the pivot portion of the base so as to rotate with respect to the base. The axial portion has at least one guiding groove. The magnetic ring is connected to the axial portion and adjacent to the base. The magnetic ring has at least one guiding portion. The at least one guiding portion of the magnetic ring is capable of sliding along the at least one guiding groove of the axial portion. When the first cover rotates with respect to the second cover, the axial portion rotates with respect to the base at the same time so as the magnetic ring is separated from the base and so as to move along the at least one guiding groove of the axial portion with the at least one guiding portion. When the first cover and the second cover stop rotation, the magnetic ring is attracted to connect to the base by magnetic force.

BRIEF DESCRIPTION OF DRAWINGS

The present invention is illustrated by way of example, and not by way of limitation, in the figures of the accompanying drawings and in which like reference numerals refer to similar elements and in which.

PREFERRED EMBODIMENTS

To clearly explain the aforementioned objectives, features and advantages of the present invention, several embodiments of the present invention along with corresponding drawings are provided as follows.

Figure 1:
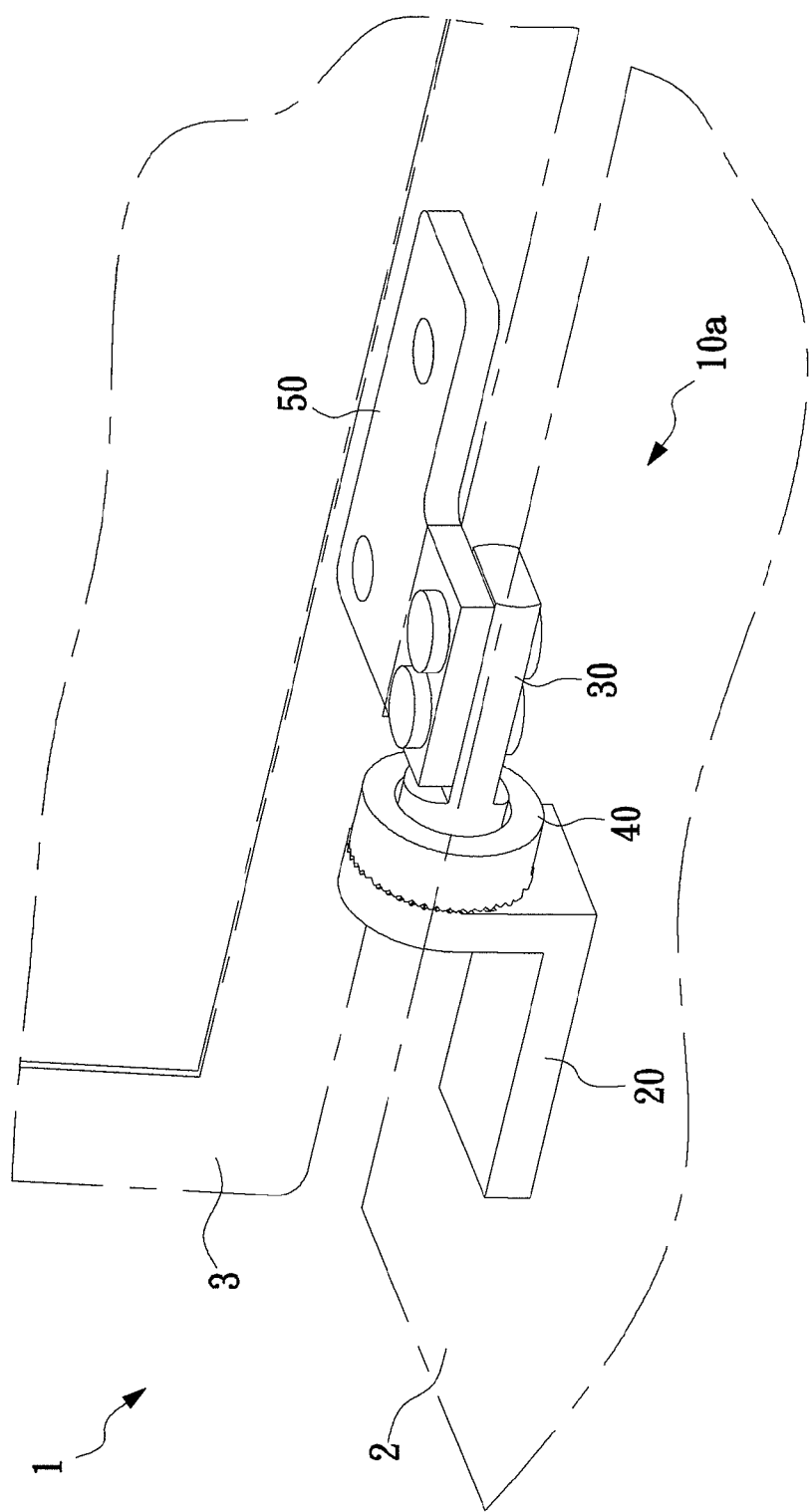
FIG. 1 illustrates a hinge mechanism of the first embodiment of the present invention used in a clamshell device.

Please refer to FIG. 1, which illustrates a first embodiment of a hinge mechanism of the present invention used in a clamshell device.

The clamshell device 1 includes a first cover 2, a second cover 3 and a hinge mechanism 10a. The hinge mechanism 10a is used for connecting the first cover 2 and the second cover 3 of the clamshell device 1 so that the first cover 2 is capable of rotating with respect to the second cover 3. For example, the clamshell 1 may be a laptop computer, a mobile phone or other devices. The clamshell device 1 in FIG. 1 is illustrated as a laptop computer. The first cover 2 is the bottom cover of the laptop computer, and the second cover 3 is the top cover of the laptop computer. However, the present invention is not limited to such configuration. In addition, the clamshell device 1 of the present invention is not necessary to be an electronic device. In FIG. 1, the clamshell device 1 has a hinge mechanism 10a, but the number of the hinge mechanism 10a may be changed according to actual requirement. The present invention is not limited to the configuration that a clamshell device 1 has only one or two hinge mechanisms 10a.

Figure 2:
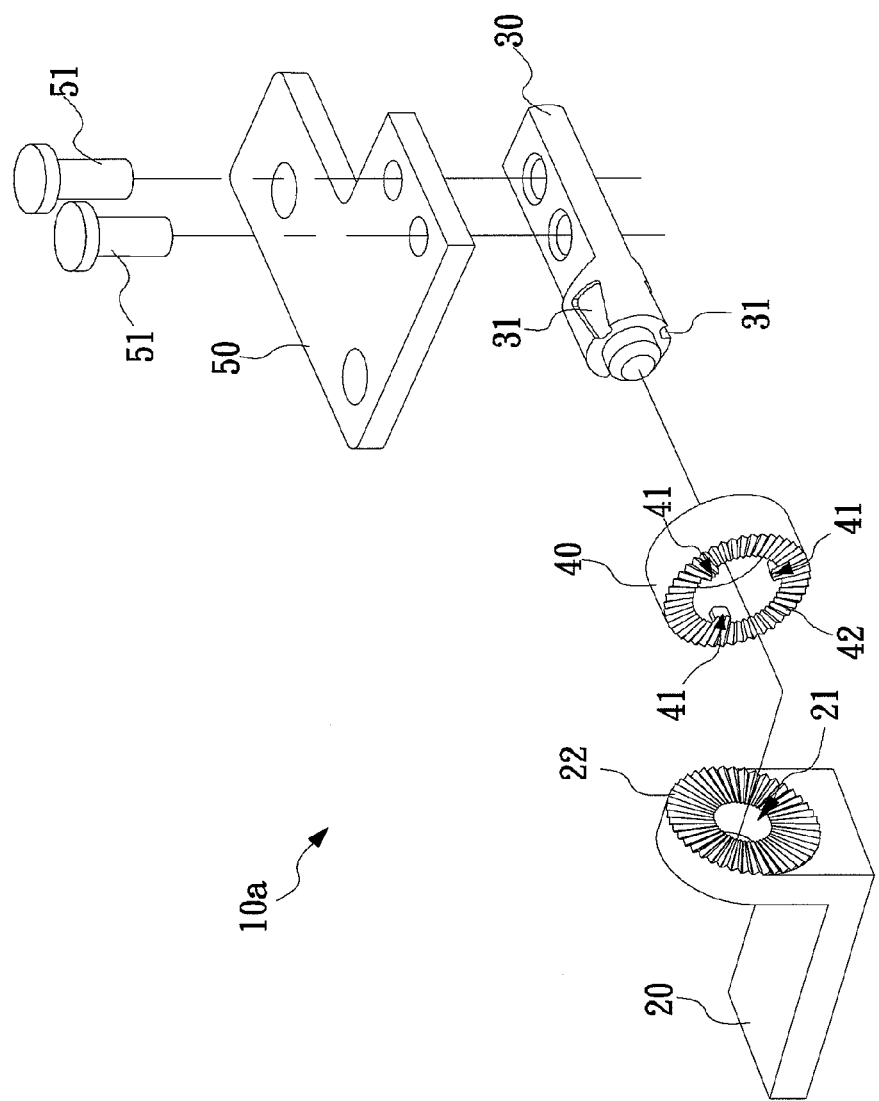
FIG. 2 illustrates a decomposition diagram of the hinge mechanism of the first embodiment.

Regarding detailed structure of the hinge mechanism 10a, please refer to FIG. 2, which is a decomposition diagram illustrating the first embodiment of a hinge mechanism according to the present invention.

The hinge mechanism 10a includes a base 20, an axial portion 30, a magnetic ring 40, and an extending support 50. The base 20 is made of metal material and may be connected to the first cover 2 with screw fixing or other methods. The base 20 has a pivot portion 21 to pivot the axial portion 30 so that the axial portion 30 may be rotated with respect to the base 20. The axial portion 30 may be rivet connected to the extending support 50 with a rivet 51 and the extending support 50 further connects to the second cover 3. But, the present invention is not limited to such configuration. For example, the axial portion 30 may be connected to the second cover 3 directly. Therefore, when the first cover 2 and the second cover 3 are rotated with respect to each other, the axial portion 30 rotates at the same time. The axial portion 30 further has at least one guiding groove 31, which function is explained in more detail in later description.

The magnetic ring 40 is connected to the axial portion 30. With magnetic force, a first contact area 22 of the base 20 is capable of adjacent to a second contact area 42 of the magnetic ring 40. In this embodiment, the first contact area 22 and the second contact area 42 respectively have corresponding teeth structures for matching each other so as to provide additional friction. On the other hand, the first contact area 22 and the second contact area 42 may also respectively have a plurality of convex structures and concave structures. For example, the first contact area 22 has a plurality of convex units and the second contact area 42 has a plurality of concave units. The plurality of convex units and the plurality of concave units match each other so that the base 20 is fixed to the magnetic ring 40. The present invention, however, is not limited to the structures of the first contact area 22 and the second contact area 42. Any shapes or structures that may match each other or may provide friction are within the protection scope of the present invention.

The inner side of the magnetic ring 40 has at least one guiding portion 41 to be socketed on at least one guiding groove 31 of the axial portion 30 so that the magnetic ring 40 may move along the axial portion 30 with the guiding groove 31. In the preferred embodiment of the present invention, the inner side of the magnetic ring 40 is evenly disposed with three guiding portions 41 corresponding to three guiding grooves 31 of the axial portion 30. The included angles between the three guiding portions 41 and the three guiding grooves 31 are about 120 degrees so that the guiding portions 41 and the guiding grooves 31 may take stress evenly. When the axial portion 30 is rotating, the guiding portion 41 slides along the guiding groove 31 so that the magnetic ring 40 is separated from the base 20 and performs axial movement. When the axial portion 30 stops rotation, the magnetic ring 40 is again attracted to connect to the base 20 because of magnetic force so as providing necessary torque of the hinge mechanism 10a.

Figure 3:
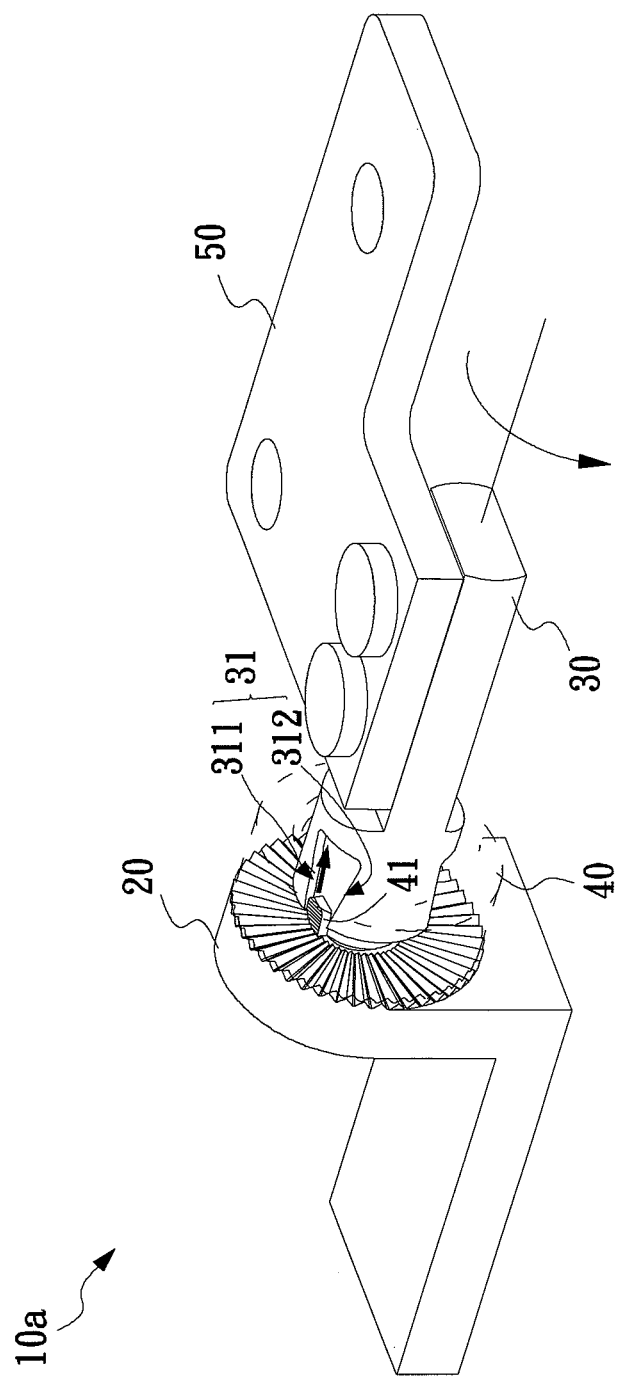
FIG. 3 illustrates the hinge mechanism of the present invention that rotates with a first rotation direction.

Next, please refer to FIG. 3, which illustrate a hinge mechanism of the present invention that rotates with a first rotation direction.

The guiding groove 31 of the axial portion 30 has a first sloping portion 311 and a second sloping portion 312. When the axial portion 30 is rotating with the first rotation direction, the guiding portion 41 of the magnetic ring 40 slides along a guiding direction of the sloping portion 311 of the guiding groove 31. The rotation speed of the axial portion 30 is determined by an included angle between the first sloping portion 311 and the axial portion 30. When the included angle between the first sloping portion 311 and the axial direction of the axial portion 30 gets larger, which means the slope level of the first sloping portion 311 gets larger, the rotation speed for the axial portion 30 moving with the first rotation direction may be faster. On the other hand, when the included angle between the first sloping portion 311 and the axial portion 30 is smaller, which means the slop level of the first sloping portion 311 gets smoother, the rotation speed for the axial portion 30 along the first rotation direction is limited.

Figure 4:
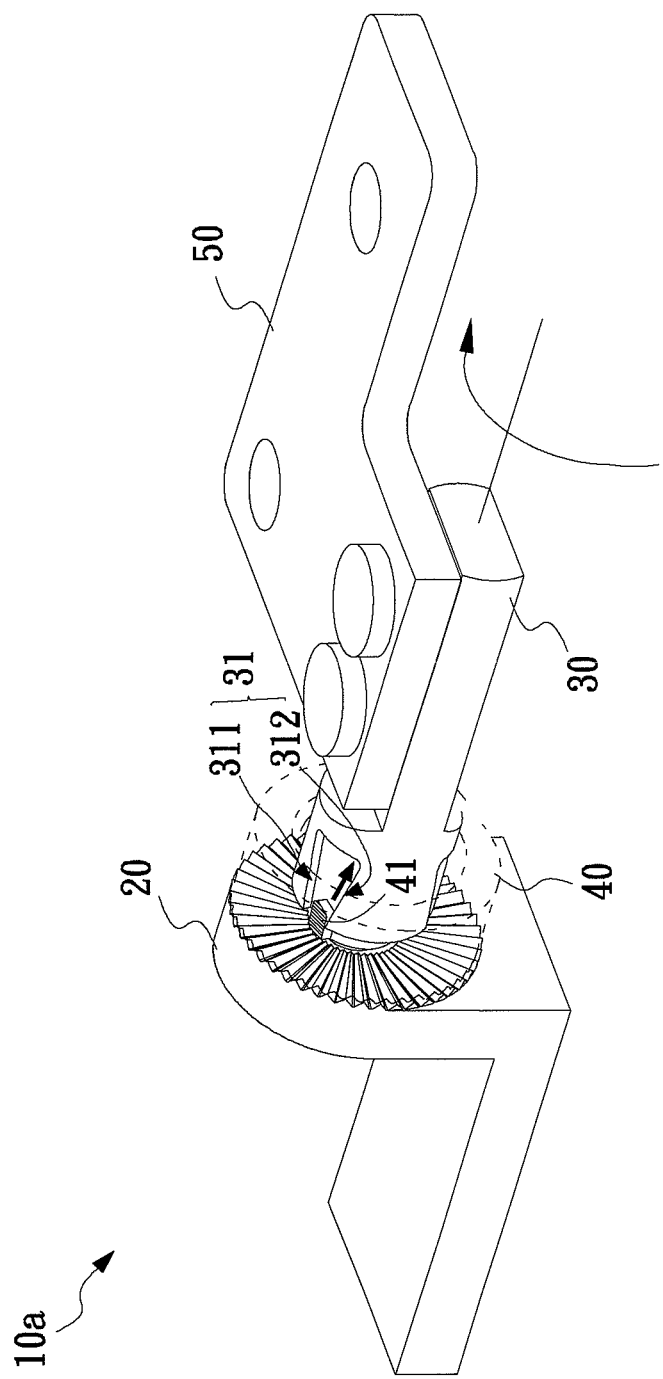
FIG. 4 illustrates the hinge mechanism of the invention that rotates with a second rotation direction.

Next, please refer to FIG. 4, which illustrates a hinge mechanism that rotates along a second rotation direction.

Similarly, when the axial portion 30 is rotating with the second rotation direction, the guiding, portion 41 of the magnetic ring 30 slides along the second sloping portion 312 of the guiding groove 31. The rotation speed of the axial portion 30 is determined by the slope level of the second sloping portion 312. When an included angle between the sloping portion 312 and the axial portion 30 gets larger, which means the slope level of the second sloping portion 312 is larger, the rotation speed of the axial portion 30 along the second rotation direction gets faster. On the other hand, when the included angle between the second sloping portion 312 and the axial portion 30 gets smaller, which means the slope level of the second sloping portion gets smoother, the rotation speed of the axial portion 30 along the second rotation speed is limited.

In one embodiment of the present invention, the slope level of the first sloping portion 311 is different from the slope level of the second sloping portion 312. The included angle between the first sloping portion 311 and the axial direction of the axial portion 30 is larger than the included angle between the second sloping portion 312 and axial direction of the axial portion 30 so that the rotation speed of the axial portion 30 rotating along the first direction is larger than the rotation speed along the second direction. Therefore, the rotation speed with closing and opening of the first cover 2 and the second cover 3 may be different. On the other hand, the present invention does not limit the first sloping portion 311 or the second sloping portion 312 being of a straight line. The shapes of the first sloping portion 311 and the second sloping portion 312 may be curved in shape, like arc curve, paracurve, or curvature forms. For example, the first sloping portion 311 and the second sloping portion 312 may have larger slope level near the base 20 and smaller slope level away from the base 20. With such design, the first cover 2 and the second cover 3 may be opened quickly at beginning and in the latter half of the opening, proper angle may be adjusted carefully. The present invention is not limited to the above mentioned embodiments.

With the above explanation, it is known that the second cover 3 brings the axial portion 30 to rotate via the extending support 50. Therefore, when the second cover 3 is rotating, the magnetic ring 40 leaves the base 20 and performs axial movement along the axial portion 30. When the second cover 3 stops rotation, the magnetic ring 40 and the base 20 adsorb to each other due to magnetic force. Therefore, the second cover 3 is fixed to a specific angle by the magnetic force or friction between the magnetic ring 40 and the base 20.

Figure 5:
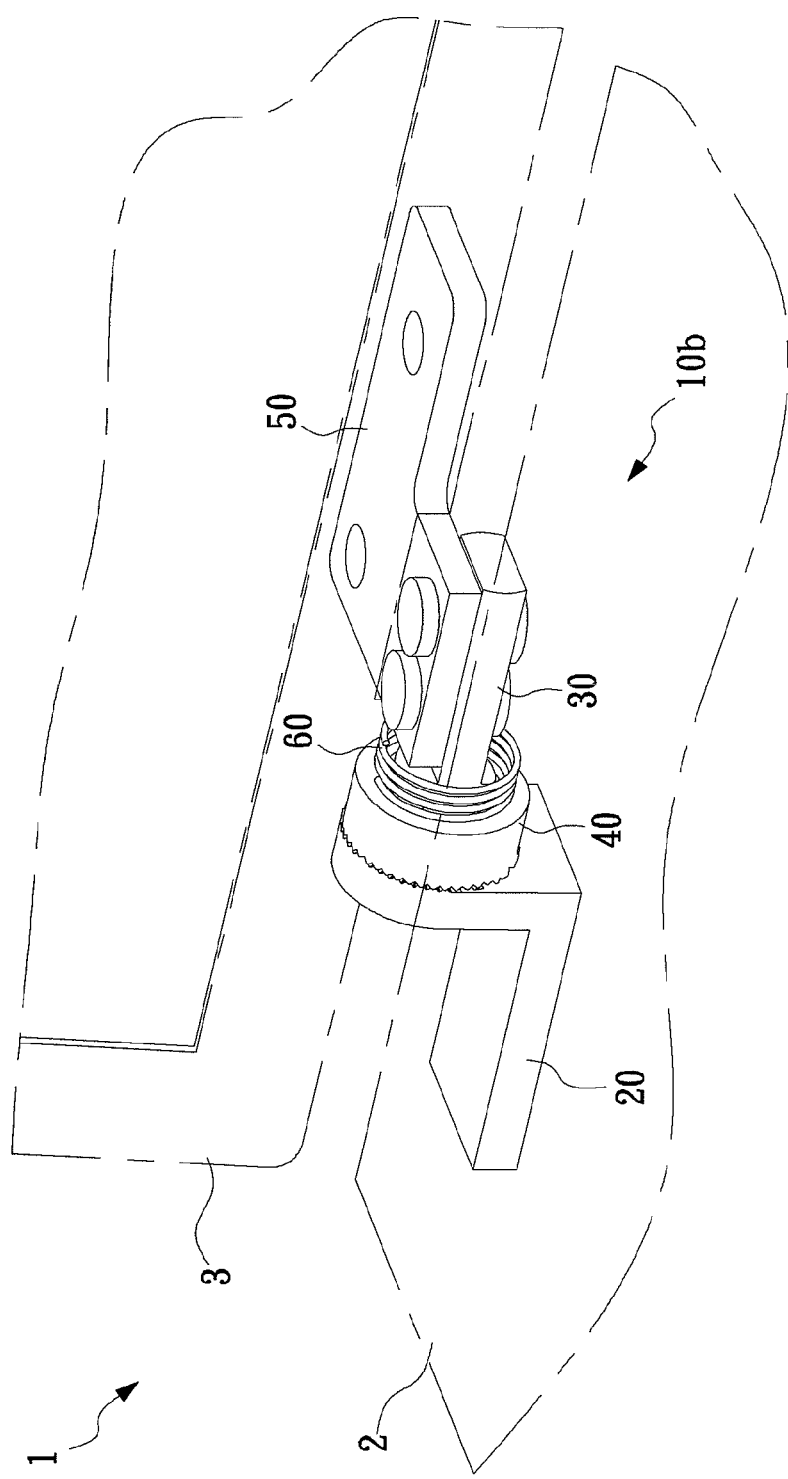
FIG. 5 illustrates a hinge mechanism of a second embodiment of the invention used in a clamshell device.

Finally, please refer to FIG. 5, which illustrates a second embodiment of a hinge mechanism of the present invention used in a clamshell device.

It is to be noted that the present invention is not limited to the above embodiments. In the second embodiment of the present invention, the hinge mechanism 10b may further have an elastic element 60. The elastic element 60 may be a spring, but the present invention is not limited to such configuration. The elastic element 60 is also socketed on the axial portion 30 and connected to the magnetic ring 40 for providing elastic force moving the magnetic ring 40 when the axial portion 30 rotates.

With the above explanation, it is known that the hinge mechanism 10a or 10b have simpler structures, use magnetic force to produce torque and are different from conventional art.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hinge mechanism comprising: a base of metal material, the base having a pivot portion; an axial portion pivoted to the pivot portion so as to rotate with respect to the base, wherein the axial portion has at least one guiding groove; and
a magnetic ring being connected to the axial portion and adjacent to the base, the magnetic ring having at least one guiding portion, the at least one guiding portion of the magnetic ring is capable of sliding along the at least one guiding groove of the axial portion; when the axial portion rotating with respect to the base, the magnetic ring being separated from the base so as to move along the at least one guiding groove of the axial portion by the at least one guiding portion; when the axial portion stopping rotation with respect to the base, the magnetic ring being attracted to connect to the base by a magnetic force.

2. The hinge mechanism of claim 1, wherein the base has a first contact area; and the magnetic ring has a second contact area, when the magnetic ring touching the base, the first contact area matches to the second contact area providing a friction.

3. The hinge mechanism of claim 2, wherein the first contact area and the second contact area respectively have a plurality of corresponding convex structures and concave structures.

4. The hinge mechanism of claim 2, wherein the first contact area and the second contact area respectively have a plurality of corresponding teeth structures matching each other.

5. The hinge mechanism of claim 1, wherein the at least one guiding groove has a first sloping portion and a second sloping portion; when the axial portion rotates in a first rotation direction, the at least one guiding portion moves along the first sloping portion, and when the axial portion rotates in a second rotation direction, the at least one guiding portion moves along the second sloping portion.

6. The hinge mechanism of claim 5, wherein a maximum rotation speed for the axial portion to rotate in the first rotation direction is determined by an included angle between the first sloping portion and the axial direction of the axial portion; and
a maximum rotation speed for the axial portion to rotate in the second rotation direction is determined by an included angle between the second sloping portion and the axial direction of the axial portion.

7. The hinge mechanism of claim 6, wherein the included angle between the first sloping portion and the axial direction of the axial portion is larger than the included angle between the second sloping portion and the axial direction of the axial portion.

8. The hinge mechanism of claim 5, wherein the first sloping portion or the second sloping portion is curved in shape.

9. The hinge mechanism of claim 1, wherein the axial portion further has an elastic element, the elastic element being connected to the magnetic ring for providing elastic force.

10. The hinge mechanism of claim 1, further comprising an extending support fixing to the axial portion.

11. A clamshell device, comprising:
a first cover; a second cover; and hinge mechanism for connecting the first cover and the second cover so that the first cover is capable of being rotated with respect to the second cover, the hinge mechanism comprising:
a base of metal material connected to the first cover, wherein the base has a pivot portion;
an axial portion pivoted to the pivot portion so as to rotate with respect to the base, wherein the axial portion has at least one guiding groove; and
a magnetic ring being connected to the axial portion and adjacent to the base, the magnetic ring having at least one guiding portion, the at least one guiding portion of the magnetic ring being capable of sliding along the at least one guiding groove of the axial portion; when the first cover and the second cover being rotated with respect to each other, the axial portion rotating with respect to the base at the same time so that the magnetic ring being separated from the base; when the first cover and the second cover stopping rotation, the magnetic ring being attracted to connect to the base by a magnetic force.

12. The clamshell device of claim 11, wherein the base has a first contact area; and the magnetic ring has a second contact area, when the magnetic ring touches the base, the first contact area matches to the second contact area providing a friction.

13. The clamshell device of claim 12, wherein the first contact area and the second contact area respectively have a plurality of corresponding convex structures and concave structures.

14. The clamshell device of claim 12, wherein the first contact area and the second contact area respectively have a plurality of corresponding teeth structures matching each other.

15. The clamshell device of claim 11, wherein the at least one guiding groove has a first sloping portion and a second sloping portion; when the axial portion rotates in a first rotation direction, the at least one guiding portion moves along the first sloping portion, and when the axial portion rotates in a second rotation direction, the at least one guiding portion moves along the second sloping portion.

16. The clamshell device of claim 15, wherein a maximum rotation speed of the axial portion to rotate in the first rotation direction is determined by an included angle between the first sloping portion and the axial direction of the axial portion; and a maximum rotation speed of the axial portion to rotate in the second rotation direction is determined by an included angle between the second sloping portion and the axial direction of the axial portion.

17. The clamshell device of claim 16, wherein the included angle between the first sloping portion and the axial portion is larger than the included angle between the second sloping portion and the axial portion.

18. The clamshell device of claim 15, wherein the first sloping portion or the second sloping portion is curved in shape.

19. The clamshell device of claim 11, wherein the axial portion further comprises an elastic element, the elastic element being connected to the magnetic ring for providing an elastic force.

20. The clamshell device of claim 11, wherein the hinge mechanism further comprises an extending support fixing to the axial portion and the second cover.

* * * * *